US006296008B1

(12) United States Patent
Boyer et al.

(10) Patent No.: US 6,296,008 B1
(45) Date of Patent: Oct. 2, 2001

(54) SWITCHOVER VALVE

(75) Inventors: Robert A. Boyer, Grapevine; David A. Pryor, Denton, both of TX (US)

(73) Assignee: Victor Equipment Company, St. Louis, MO (US)

(*) Notice: Subject to any disclaimer, the term of this patent is extended or adjusted under 35 U.S.C. 154(b) by 0 days.

(21) Appl. No.: 09/665,974

(22) Filed: Sep. 20, 2000

(51) Int. Cl.[7] .......... F16K 11/044

(52) U.S. Cl. .......... 137/113; 251/73; 251/94

(58) Field of Search .......... 137/113; 251/73, 251/94

(56) References Cited

U.S. PATENT DOCUMENTS

| | | | |
|---|---|---|---|
| 2,440,478 | 4/1948 | Kehle . | |
| 2,626,628 * | 1/1953 | Norway et al. | 137/113 |
| 2,651,491 | 9/1953 | Ashton et al. . | |
| 3,033,220 * | 5/1962 | St. Clair | 137/113 |
| 3,464,741 | 9/1969 | Falk . | |
| 3,533,431 | 10/1970 | Kuenzel . | |
| 4,253,481 | 3/1981 | Sarlis, Jr. . | |
| 4,493,435 | 1/1985 | Hartley . | |
| 4,674,526 | 6/1987 | Athanassiu . | |
| 5,014,733 | 5/1991 | Wilson . | |
| 5,127,426 | 7/1992 | D'Archambaud . | |

* cited by examiner

*Primary Examiner*—Stephen M. Hepperle
(74) *Attorney, Agent, or Firm*—Senniger, Powers, Leavitt & Roedel

(57) ABSTRACT

A switchover valve for switching over from one supply of pressure fluid to another supply thereof in response to failing or failure of the one supply. The valve has a valve body having two inlets for connection thereto of the respective pressure fluid supplies and an outlet. A valve member is movable in the valve body between a position establishing communication for delivery of fluid from one inlet to the outlet and blocking flow from the other inlet to the outlet and a position establishing communication for delivery of fluid from the other inlet to the outlet and blocking flow from the one inlet to the outlet. The valve member is subject to pressure of fluid supplied to the one inlet for moving it from the first-mentioned position to the second-mentioned position and to pressure of fluid supplied to the other inlet for moving it from the second-mentioned position to the first-mentioned position. A latch for latching the valve member in one or the other of its positions is movable between a latching position engaging the valve member and a retracted position clearing the valve member for movement. The latch is biased toward the retracted position and is held in latching position against the bias by pressure of fluid delivered by the valve member in one or the other of its positions. The latch moves to the retracted position under the bias upon a drop in pressure of fluid delivered by the valve member in either of its positions.

12 Claims, 5 Drawing Sheets

SWITCHOVER VALVE

BACKGROUND OF THE INVENTION

This invention relates generally to a type of valve which may be termed a “switchover valve”, and more particularly to a valve for automatically switching over from one supply of pressure fluid in response to failing or failure thereof to another supply of pressure fluid for continuity of operation.

The invention is especially concerned with a valve for switching over delivery of a gas (e.g. oxygen, nitrogen) from a bottled supply thereof under pressure upon depletion of the supply (the content of the bottle) to another bottled pressurized supply of the gas for continuity of supply of the gas for whatever the ultimate use thereof may be, one example being switchover of bottles supplying oxygen for the medical need of a patient. Another example is switchover of bottles of gas used for industrial purposes, such as the use of bottles of oxygen and other gases for welding purposes.

Reference may be had to the following U.S. Patents disclosing valves purportedly for a generally similar purpose, often referred to as “shuttle” valves:

| U.S. Pat. No. | Date of Issue | Title |
|---|---|---|
| 3,533,431 | Oct. 13, 1970 | Snap Acting Valve Mechanism |
| 4,253,481 | March 3, 1981 | Cushioned Shuttle Valve |
| 4,674,526 | June 23, 1987 | Switching Valve |
| 5,127,426 | July 7, 1992 | Valve |

SUMMARY OF THE INVENTION

Among the several objects of the present invention may be noted the provision of a switchover valve, for automatically switching over from one supply of pressure fluid (e.g. gas) to another supply in response to a drop in pressure of the one supply, which is substantially safe against false switchovers; the provision of such a switchover valve having means positively holding against switchover except on a drop in pressure below a predetermined value of the supply; the provision of such a switchover valve wherein the holding means is adjustable for setting different values for the switchover pressure drop; the provision of such a switchover valve which is immune to reverse flow; and the provision of such a switchover valve which is relatively economical to manufacture and reliable in operation.

Generally, a switchover valve of the present invention for switching over from one supply of pressure fluid to another supply thereof in response to failing or failure of the one supply comprises a valve body having two inlets for connection thereto of the respective supplies and an outlet. A valve member is movable in the valve body between a position establishing communication for delivery of fluid from one inlet to the outlet and blocking flow from the other inlet to the outlet and a position establishing communication for delivery of fluid from the other inlet to the outlet and blocking flow from the one inlet to the outlet. The valve member is subject to pressure of fluid supplied to the one inlet for moving it from the first-mentioned position to the second-mentioned position and to pressure of fluid supplied to the other inlet for moving it from the second-mentioned position to the first-mentioned position. The switchover valve also comprises a latch for latching the valve member in one or the other of its positions. The latch is movable between a latching position engaging the valve member and a retracted position clearing the valve member for movement. The latch is biased toward the retracted position and is held in the latching position against the bias by pressure of fluid delivered by the valve member in one or the other of its positions. The latch moves to the retracted position under the bias upon a drop in pressure of fluid delivered by the valve member in either of its positions.

More particularly, a valve of this invention comprises a valve body having a first cylinder therein, the body having two inlets for connection thereto of the respective supplies. One inlet communicates with one end of the first cylinder and the other inlet communicates with the other end of the first cylinder. An outlet in the body extends radially outward from the first cylinder generally at the center of length of the first cylinder. A second cylinder in the body extends outward from the first cylinder intermediate the ends of the first cylinder. The second cylinder is open to the outlet for exposure to the pressure of fluid in the outlet. A piston constituting a switchover valve member is slidable in the first cylinder between a position establishing communication for delivery of fluid from one inlet to the outlet and blocking flow from the other inlet to the outlet and a position establishing communication for delivery of fluid from the other inlet to the outlet and blocking flow from the one inlet to the outlet. The piston is subject to pressure of fluid supplied to the one inlet for moving it from the first-mentioned position to the second-mentioned position and to pressure of fluid supplied to the other inlet for moving it from the second-mentioned position to the first-mentioned position. A latch piston is slidable in the second cylinder and has a latch thereon for latching the valve member in one or the other of its positions. The latch is movable between a latching position engaging the valve member and a retracted position clearing the valve member for movement. The latch is biased toward the retracted position and is held in latching position against the bias by pressure of fluid delivered by the valve member in one or the other of its positions. The latch moves to the retracted position under the bias upon a drop in pressure of fluid delivered by the valve member in either of its positions. The switchover piston and the latch piston have a cooperating recess and detent arrangement for holding the switchover piston in one or the other of its two positions.

Other objects and features of the present invention will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENT

Figure 4:
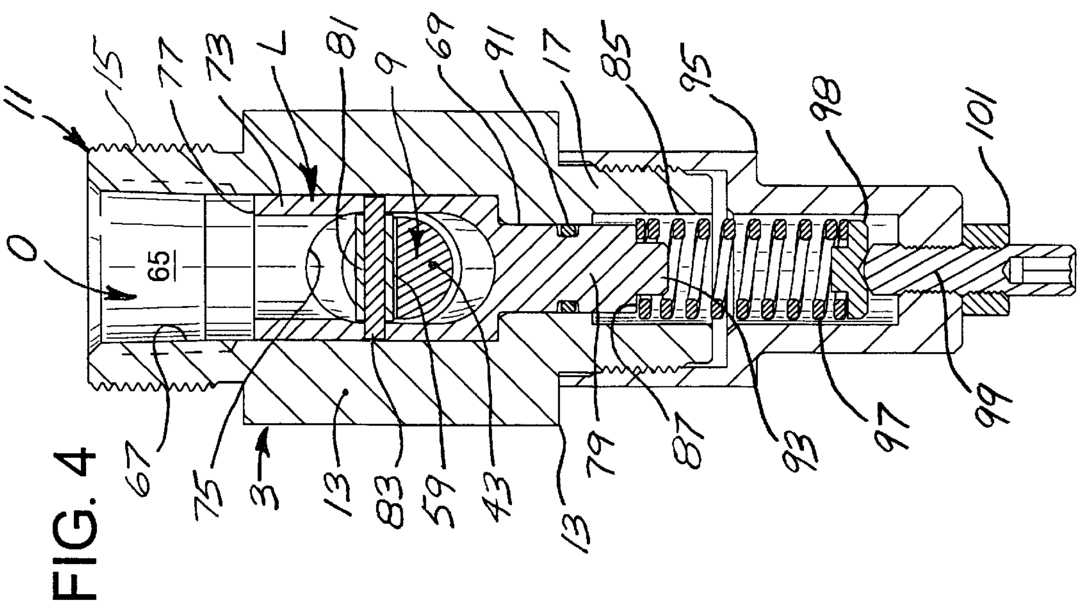
FIG. 4 is an enlarged cross-section taken on line 4—4 of FIG. 2 showing the latch piston in a latching position.

Referring to the drawings, a valve of this invention for switching over from one supply of pressure fluid to another supply thereof in response to failing or failure of the one supply is designated in its entirety by the reference numeral 1. The valve comprises a valve body 3 having two inlets 5, 7 for connection thereto of the respective supplies and an outlet O. A valve member 9 is movable in the body between the position shown in FIG. 2 establishing communication for delivery of fluid from the one inlet 5 to the outlet 0 and blocking flow from the other inlet 7 to the outlet and a position establishing communication for delivery of fluid from the other inlet 7 to the outlet and blocking flow from the one inlet 5 to the outlet. The valve member 9 is subject to pressure of fluid supplied to the one inlet 5 for moving it from the first-mentioned position to the second-mentioned position and to pressure of fluid supplied to the other inlet 7 for moving it from the second-mentioned position to the first-mentioned position. The switchover valve also has a latch L for latching the valve member 9 in one or the other of its positions. The latch L is movable between a latching position (FIGS. 2 and 3) engaging the valve member 9 and a retracted position (not shown) clearing the valve member for movement. The latch is biased toward the retracted position and is held in the latching position against the bias by pressure of fluid delivered by the valve member 9 in one or the other of its positions. The latch L moves to the retracted position under the bias upon a drop in pressure of fluid delivered by the valve member 9 in either of its positions.

Figure 1:
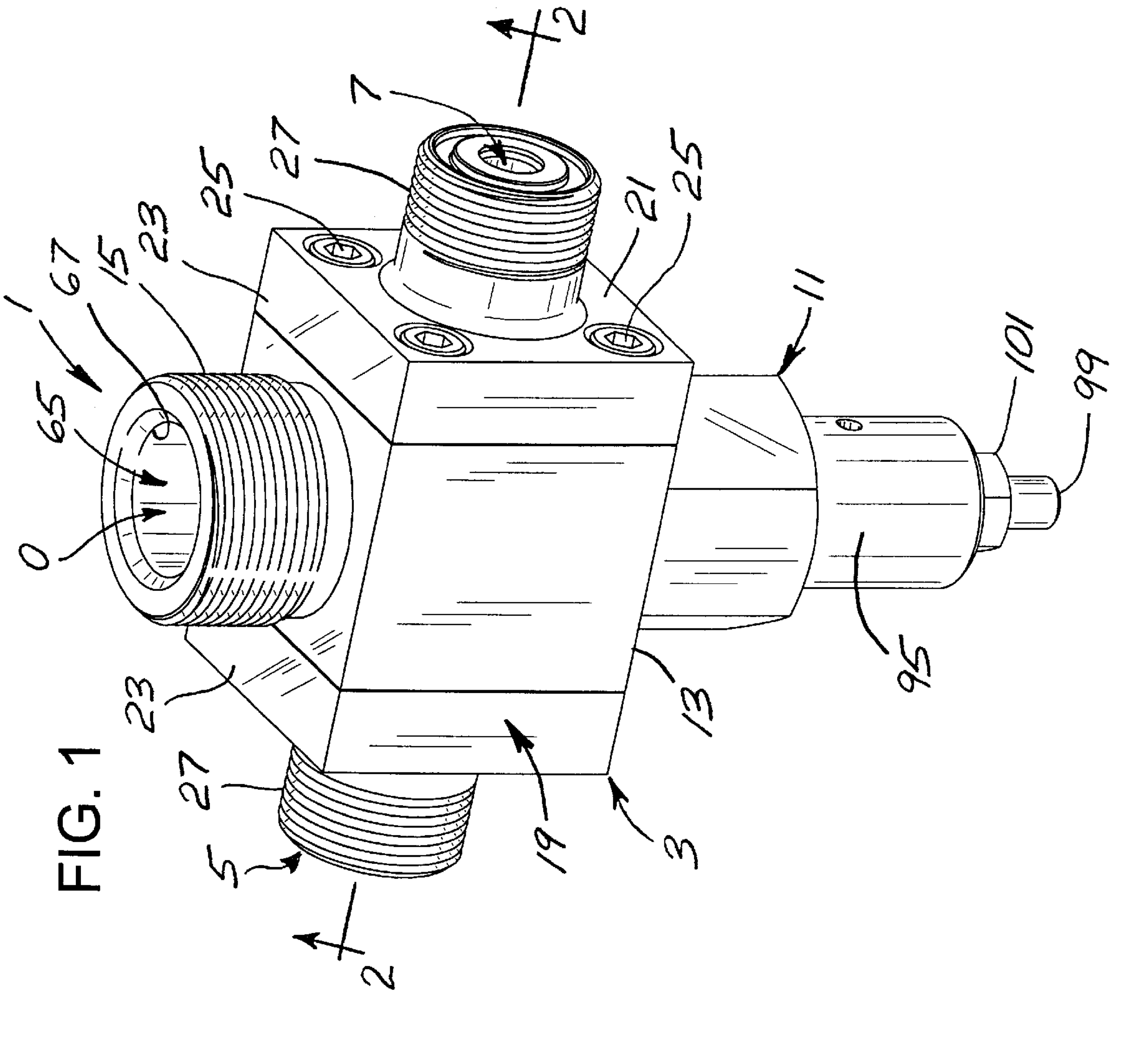
FIG. 1 is a perspective of a switchover valve of the present invention.

The valve body 3, preferably made of brass, is of three-part construction, comprising a central elongate main block 11 (FIG. 3) having a generally cubic center section 13, a first cylindrical externally threaded extension 15 extending from one face thereof (extending upward from the upper square face thereof, as illustrated) and a second cylindrical externally threaded extension 17 extending from the opposite face (extending downward therefrom as illustrated). Secured on opposite sides of the center section 13 are side members 19 and 21, member 19 being on the left side as appears in FIGS. 1–3 and member 21 being on the right side. Each of members 19 and 21 comprises a square section 23 secured by screws 25 (FIG. 1) to the respective side face of center section 13 of block 11 having an externally threaded outwardly extending cylindrical extension 27. Section 23 of each member 19 and 21 has a circular recess 29 therein in the inside face thereof in which there is a sealing ring 31 preferably of brass with an O-ring 33 for sealing the joints between members 19, 21 and block 11 (see FIGS. 2 and 3).

Extending from the left to right (as illustrated) through valve body 3 is a cylinder 35 referred to as the first cylinder in which the aforesaid valve member 9 is movable. This first cylinder is formed by a cylindric bore 37 extending from the left to the right side of the cubic center section 13 of valve body 3 having an enlarged central portion 37*a*, a bore 39 in member 19 and a bore 41 in member 21, these bores all being coaxial. Inlets 5 and 7 are constituted by tapered entrances to bores 39 and 41 at the ends of cylinder 35, there being an annular bumper 43 at each of said ends for engagement by the ends of the valve member 9 as will appear. The bore 37 in section 13 of body 3 is of larger diameter than bores 39, 41 and constitutes a central chamber of cylinder 35, bores 39 and 41 constituting end chambers.

Figure 6:
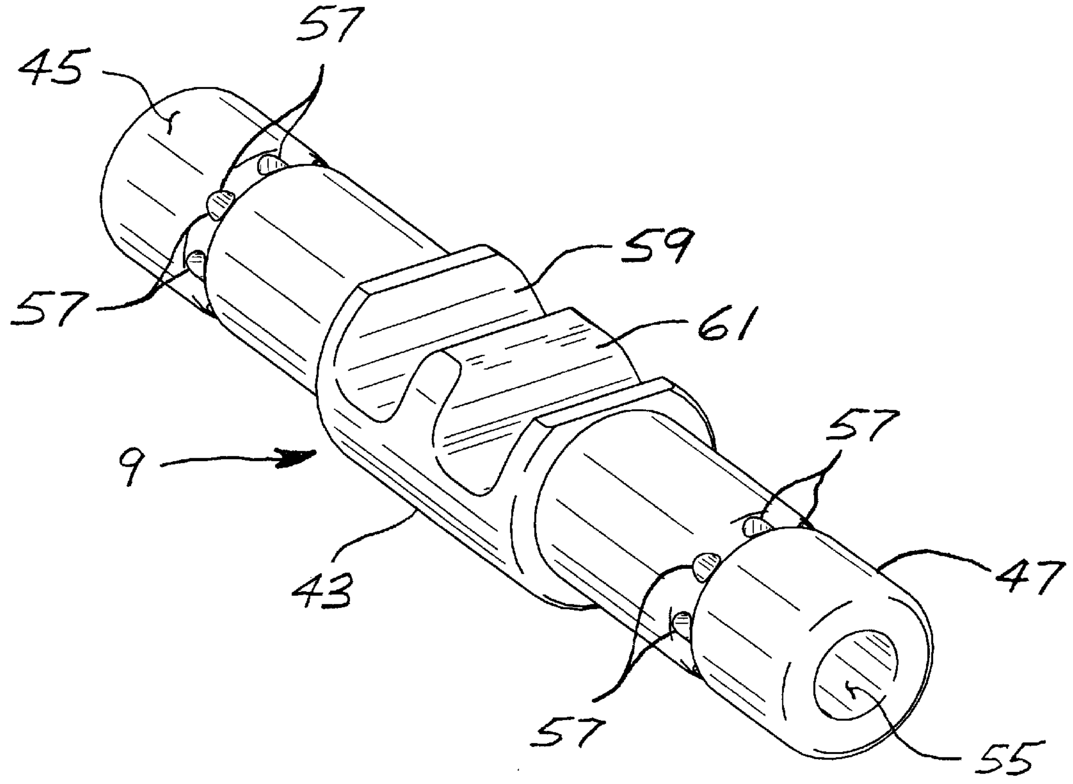
FIG. 6 is a perspective of the switchover piston per se.

The valve member 9 is more particularly termed a switchover piston. As shown in FIG. 6, it is constituted by an elongate cylindric member having a central section 43 of smaller cross-section than central chamber 37 and end sections 45 and 47 having a slidable fit in the bores or end chambers 39 and 41, an O-ring seal 49 being provided for each end section 45, 47. O-rings 49 are located just outward of the sealing rings 31.

Figure 2:
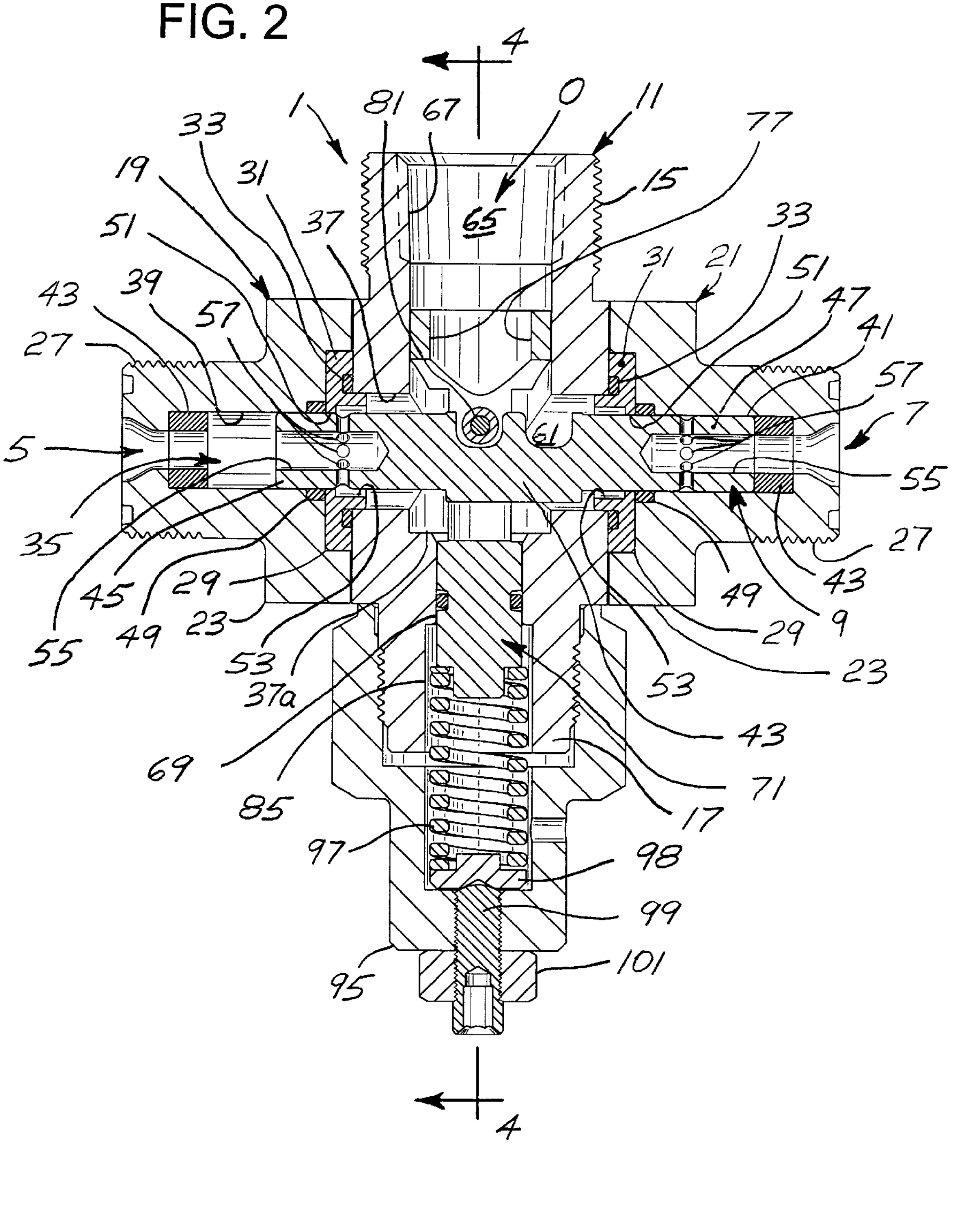
FIG. 2 is an enlarged cross-section taken on line 2—2 of FIG. 1 showing the switchover piston in one of its two positions.

Each of end sections 45, 47 of the switchover piston 9 is sealingly slidable in a radially inwardly extending annular flange 51 of a respective sealing ring 31, each flange 51 being at the outer side of a circular opening 53 in the respective ring 31 (FIG. 2). Each of end sections 45, 47 has a bore 55 extending inwardly from its end for some distance with a plurality of radial ports 57 adjacent the inner ends of bores 55, the arrangement being such that when the switchover piston 9 is in the right-hand position of FIG. 2 with its right end engaging the right-hand bumper 43, the left-hand ports 57 are just to the right of the left-hand flange 51 establishing communication between the left-hand bore or passage 55 in switchover piston 9 and the central chamber 37 of cylinder 35, and the right-hand ports 57 are to the right of the right-hand flange 51 and the right-hand O-ring 49 thus blocking communication between the bore or passage 55 in switchover piston 9 and chamber 37. And when the switchover piston 9 is in the left-hand position of FIG. 3 with its left end engaging the left-hand bumper 43, the right-hand ports 57 are just to the left of the right-hand flange 51 establishing communication between the right-hand bore or passage 55 in switchover piston 9 and the central chamber 37 of cylinder 35, and the left-hand ports 57 are to the left of the left-hand O-ring 49, thus blocking communication between the left-hand bore or passage 55 in switchover piston 9 and chamber 37.

The outlet O in the valve body 3 is formed by part of a bore designated 65 in its entirety extending from top to bottom of section 13 of the body (as it is drawn) generally at right angles to the cylinder 35 and intersecting the central chamber 37 of the latter. This outlet part of the bore 65 is designated 67; it extends radially outward (upward) from the central chamber 37 through extension 15 at the top of the body 3. A part 69 of bore 65 extending radially outward (downward) from the central chamber 37 (i.e. outward from cylinder 35), which is of smaller diameter than outlet part 67, constitutes a second cylinder of the valve 1.

Figure 5:
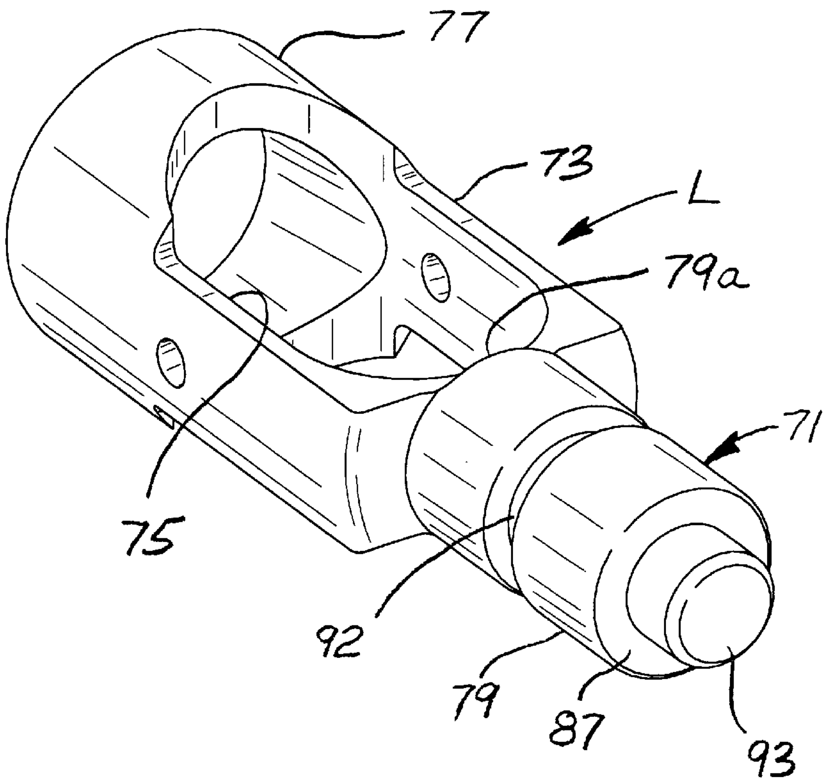
FIG. 5 is a perspective of the latch piston per se, a roller thereon being omitted.

As best illustrated in FIG. 5, latch L comprises what may be termed a latch piston 71 slidably disposed in the second cylinder part 69 and the central chamber 37 of the first cylinder 35. The latch piston 71 includes a flat generally rectangular middle section 73 having an opening 75 larger than the cross-section of switchover piston 9 allowing the switchover piston to be slidably disposed therein, a tubular cylindrical top section or extension 77 and a solid cylindric bottom section 79. The cylindrical top section 77 and the cylindric bottom section 79 are coaxial. The cylindrical top section 77 is axially slidable within outlet part 67 of the bore 65, having a diameter substantially equal thereto. The cylindric bottom section 79 is axially slidable within the second cylinder part 69 of the bore 65 and is of a diameter substantially equal thereto. It has an end surface 79*a* exposed to pressure of fluid in the outlet O. The flat generally rectangular middle section 73 of the latch piston L carries a roller 81 on a pin 83 (not shown in FIG. 5; see FIG. 4) acting as a detent and engageable in the annular grooves 59, 61 of the switchover piston 9 such that when the latch piston is in a lower or latching position, the latch roller 81 is positioned in one of the annular grooves and thereby positively holds the switchover piston in place. When the switchover piston 9 is in a retracted (upper) position, the roller is clear of the annular grooves thereby allowing the switchover piston to move within the opening 75 and therefore the first cylinder 35 and the chambers 39, 41. Alternatively, it will be understood that the switchover piston 9 could have detents extending outward therefrom that engage recesses in the latch piston L for positively holding the switchover piston in place.

The cylindric bottom section 79 of the latch piston L extends down out of second cylinder 69 into a counterbore 85 in the lower end extension 17 of the valve body part 13, having a bottom surface 87. An O-ring 91 (FIG. 4) in an annular groove 92 (FIG. 5) in the cylindric bottom section 79 of the latch piston L seals the outlet part 67 of the bore 65 and the central chamber 37 of the first cylinder 35 from the second cylinder counterbore 85. Extending coaxially from the bottom surface 87 of the cylindric bottom section 79 of the latch piston L is a cylindrical protrusion 93 of a smaller diameter than the cylindrical bottom section. A housing 95 is threaded on extension 17. A biasing means comprising a coil compression spring 97 is disposed within the housing 95. The upper end of the spring engages the bottom surface 87 of the cylindric bottom portion 79, the cylindrical protrusion 93 serving to locate the spring, and the lower end of the spring seats against a spring seat 98. An adjustment screw 99 disposed beneath the spring seat is threaded in the bottom of housing 95, serving to compress the spring. The action of the spring thereby biases the latch piston L towards the aforementioned retracted position. A locking nut 101 in threaded engagement with the adjustment screw is disposed against the lower end of the housing 95 to lock the adjustment screw in the desired position. Preferably, the spring is a coil compression spring. However, it will be understood that any suitable biasing means capable of adjustment may be utilized.

Figure 7:
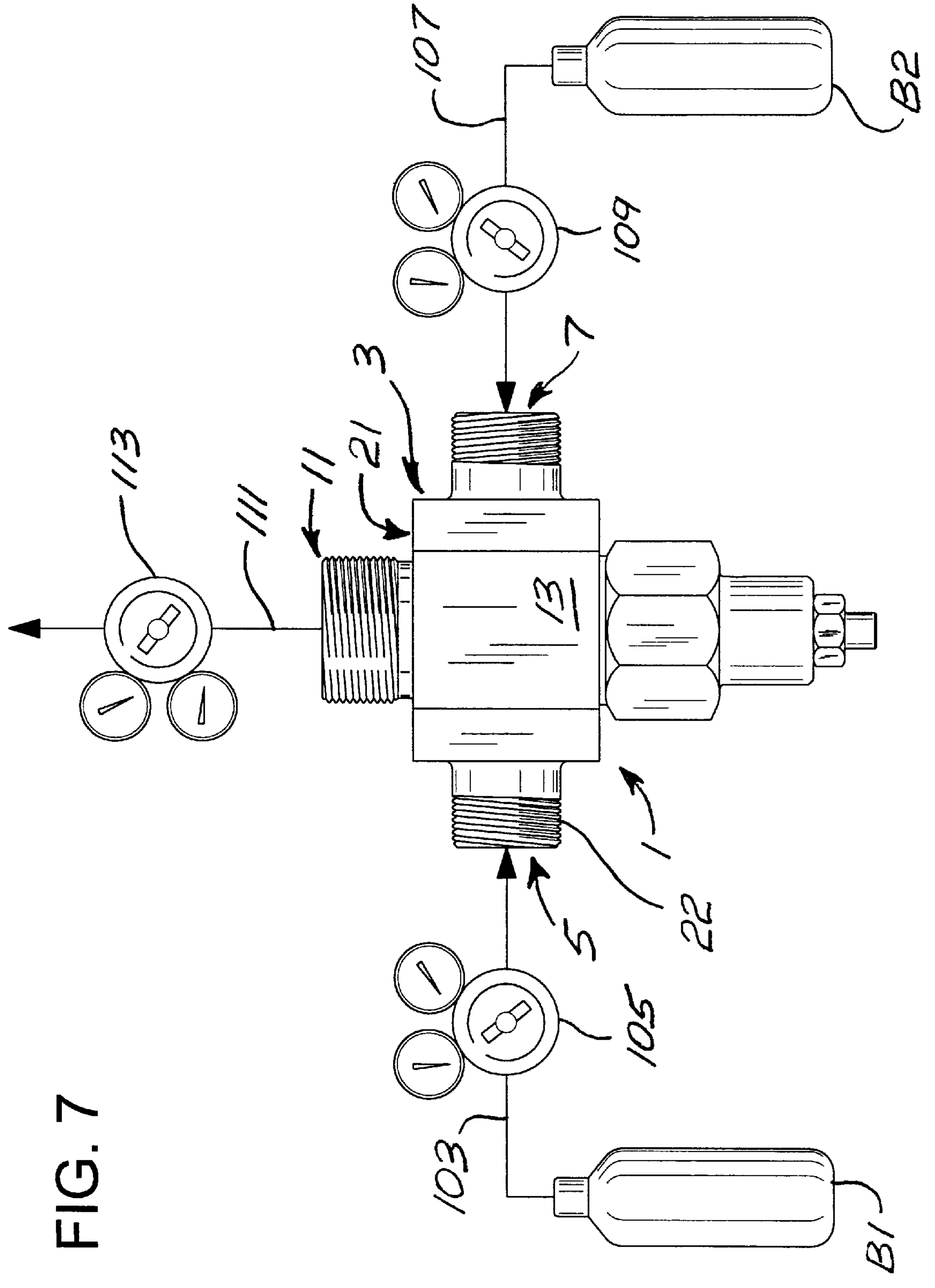
FIG. 7 is a view showing bottles of pressurized gas connected to the inlets of the switchover valve.

In the use of the switchover valve, a supply of pressurized fluid is connected to each inlet 5, 7. As shown in FIG. 7, a bottle B1 of gas under pressure is connected by a line 103 including a pressure regulator 105 to inlet 5, and a bottle B2 of the gas under pressure is connected by a line 107 including a pressure regulator 108 to inlet 7. Also shown is an outlet line 111 including a pressure regulator 113. The threads on extensions 15 and 27 are utilized for the connection of lines 111, 103, and 107. The valve member or switchover piston 9 is initially in a position allowing communication between one inlet (e.g. inlet 5) and the outlet O and blocking communication between the other inlet (e.g. inlet 7) and the outlet. Thus, in the position shown in FIG. 2, pressurized fluid flows through inlet 5 into the left end of cylinder 35, then through the left-hand passage 55 in switchover piston 9 and the left-hand ports 57 to the central chamber 37 of the first cylinder 35, and then through the tubular cylindrical top section 77 of the latch piston 71 and the outlet O. This pressurized fluid works on the latch piston 71 forcing it downward against the bias of the spring 97, thereby forcing the roller 81 on the latch middle section 73 downward into the annular groove 59 of the switchover piston 9. In this latched position, the latch piston positively holds the switchover piston 9 in place against the force of the pressurized fluid at the inlet 7. However, because the latch piston is biased upward by the spring 97, when the pressure of the fluid delivered from the inlet 5 falls below a predetermined limit (e.g., 90 psig) the action of the spring overcomes this pressure and forces the latch piston upward into its aforementioned retracted position and thus forces the roller 81 out of the annular groove 59 thereby clearing the switchover piston 9 for movement. This allows the greater pressure at the inlet 7 working on the switchover piston 9 to overcome the lesser pressure at the inlet 5 working on the switchover piston thereby moving the switchover piston within the central chamber 37 of the first cylinder 35 and the chambers 39, 41 to the left to the position shown in FIG. 3 allowing communication between the inlet 7 and the outlet O and blocking communication between the inlet 5 and the outlet. In this position, the pressurized fluid delivered from the inlet 7 works on the latch piston forcing the roller 81 downward, against the bias of the spring 97, into the annular groove 61 thereby positively holding the switchover piston in place.

The predetermined pressure limit effectuating switchover can be adjusted by increasing or decreasing the biasing force of the spring 97 via the set screw 99. Further, due to the pressure differential between fluid supplies when switchover is triggered, switchover occurs virtually instantaneously therefore delivering an uninterrupted flow of fluid through the outlet O. This aspect of the present invention is very important when the switchover valve is used for medical purposes, such as the supply of oxygen to a patient, or other purposes that demand uninterrupted flow of pressurized fluid.

Figure 3:
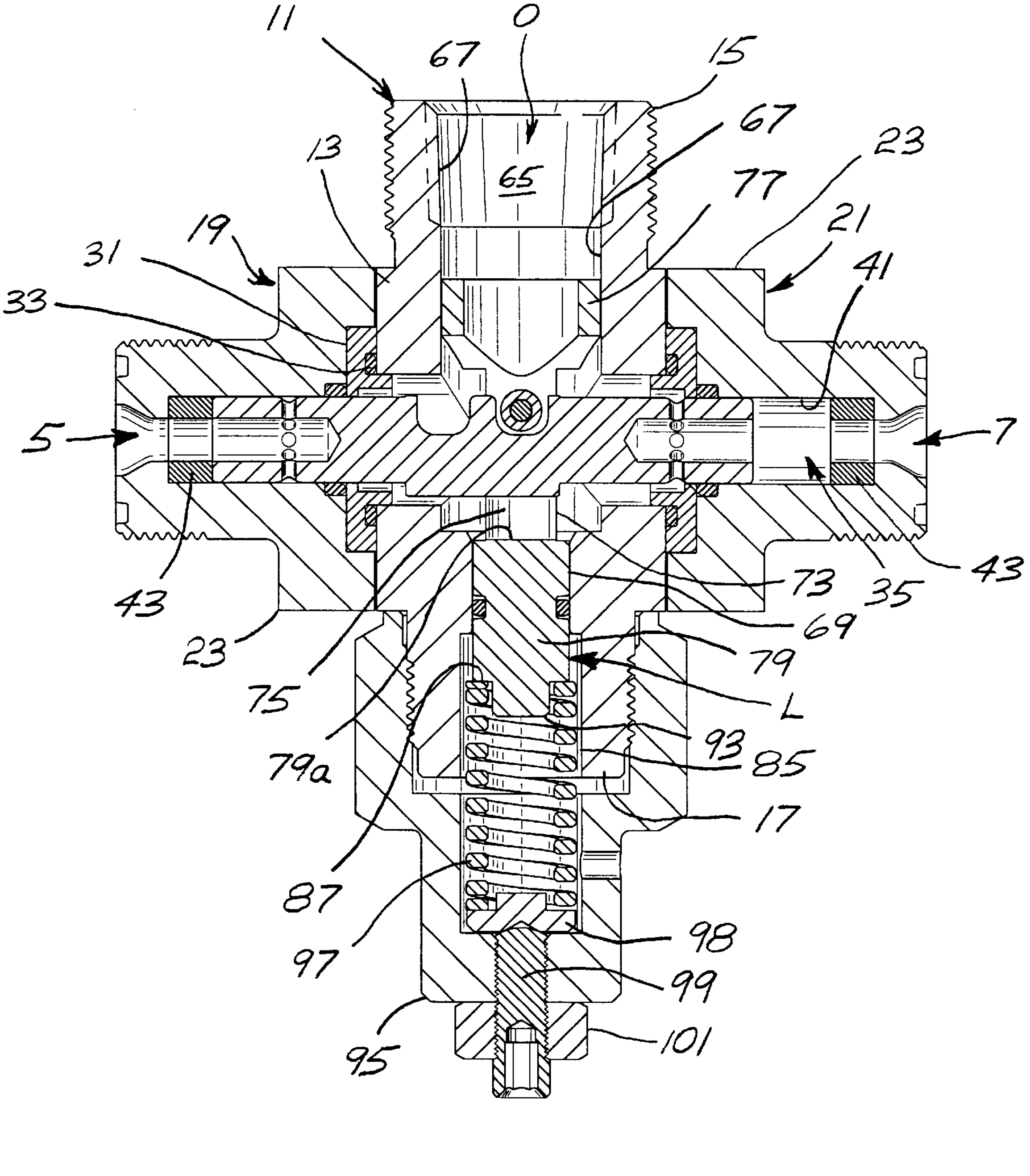
FIG. 3 is an enlarged cross-section similar to FIG. 2 showing the switchover piston in the other of its two positions.

Now assuming the valve member or switchover piston 9 is in the FIG. 3 position allowing communication between inlet 7 and outlet O and blocking communication between inlet 5 and the outlet, pressurized fluid flows through inlet 7 to central chamber 37 of cylinder 35 and through the top section 77 of the latch piston 71 and out through outlet O. This pressurized fluid works on piston 71 forcing it downward against the bias of spring 97, thereby forcing roller 81 into groove 61 of the switchover piston 9. Thus, the latter is positively held in the FIG. 3 position against the force of pressurized fluid at the inlet 5. When the pressure of fluid delivered from inlet 7 falls below a predetermined limit (as set by adjustment of the screw 99), latch piston 71 moves up to retracted position under the bias of spring 97 clearing switchover piston 9 for movement under the pressure in chamber 39 back to the FIG. 2 position, wherein it becomes latched as shown and described.

It will be understood that the present invention can be used for delivery of pressurized gas or liquid. Pressurized gas may be required for industrial purposes, such as the supply of gas for welding equipment, or medical purposes, such as the supply of oxygen to a patient. When pressurized gas is required, pressure regulators are utilized to reduce the pressure of the gas as it travels from the fluid supply (typically a cylinder containing pressurized gas) to the respective inlet therefore supplying a device or patient with gas at the required pressure. For example, the pressure of gas in a full cylinder is typically about 2200 to 2600 psig. and is usually reduced by a pressure regulator to around 300 psig for supply to the respective inlet. In this instance, switchover would typically occur when the pressure supplied to the respective inlet is reduced to around 200 psig. However, pressure regulators are not utilized when pressurized liquid, such as liquid nitrogen or oxygen, is required. Instead, the liquid is channeled through a vaporizer that transforms the liquid into a gas before being supplied to the respective inlet. Because this gas is already at low pressure, e.g. 225 psig, no pressure regulator is required.

It will be apparent from the foregoing that the switchover valve herein described has many advantages. Previous valves of this type depend on the pressure differential between both fluid supplies to effect automatic switchover. Therefore, false readings of the pressure in one or both of the fluid supplies can cause the valve to switch over from one fluid supply to the other supply repeatedly before the initial fluid supply is exhausted. The present invention, however, includes a latching mechanism that positively holds against switchover and relies only on the pressure of the fluid supply delivering fluid to the outlet working against the bias of the spring 155. Therefore, switchover will not occur until the pressure of the fluid supply delivering fluid to the outlet falls below a predetermined limit. Thus, the switchover valve of the present invention is substantially safe against false switchovers. Also, the predetermined pressure limit that triggers switchover can be adjusted by compressing the spring 97 more or less via set screw 99 thereby increasing or decreasing the biasing force of the spring. Further, previous valves of this type require check flow valves to prevent reverse flow from the outlet back through the inlet when the pressure of fluid at the inlet is substantially decreased before switchover. However, because the switchover valve of the present invention allows switchover to occur at a predetermined pressure at the respective inlet, this pressure limit can be set to avoid allowing the respective inlet pressure to fall to a value allowing reverse flow. Therefore, the switchover valve of the present invention is immune to reverse flow. Finally, the switchover valve of the present invention is substantially simpler in structure than previous valves of this type and is therefore relatively economical to manufacture and reliable in operation.

In view of the above, it will be seen that the several objects of the invention are achieved and other advantageous results attained.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A valve for switching over from one supply of pressure fluid to another supply thereof in response to failing or failure of the one supply, said valve comprising:

a valve body having two inlets for connection thereto of the respective supplies and an outlet;

a valve member movable in the body between a position establishing communication for delivery of fluid from one inlet to the outlet and blocking flow from the other inlet to the outlet, and a position establishing communication for delivery of fluid from the other inlet to the outlet and blocking flow from the one inlet to the outlet;

said valve member being subject to pressure of fluid supplied to said one inlet for moving it from the first-mentioned position to the second-mentioned position and to pressure of fluid supplied to the other inlet for moving it from the second-mentioned position to the first-mentioned position;

a latch for latching the valve member in one or the other of said positions, said latch being movable between a latching position engaging the valve member and a retracted position clearing the valve member for movement;

said latch being biased toward said retracted position and being held in latching position against the bias by pressure of fluid delivered by the valve member in one or the other of its said positions; and said latch moving to said retracted position under the bias upon a drop in pressure of fluid delivered by the valve member in either of its said positions.

2. A valve as set forth in claim 1 for switching over from one bottle of gas under pressure to another, each inlet being formed to provide for delivery of gas thereto from a respective bottle.

3. A valve as set forth in claim 1 wherein the bias on the latch establishes the requirement for the drop in pressure below a predetermined value for retraction of the latch for switchover.

4. A valve as set forth in claim 3 wherein the bias is adjustable for setting different values for the pressure drop needed for switchover.

5. A valve as set forth in claim 4 wherein the latch is biased in the direction for its retraction by a spring with provision for adjusting the force of the spring on the latch.

6. A valve as set forth in claim 5 wherein the spring is a coil compression spring and the provision for adjustment adjusts the compression of the spring.

7. A valve as set forth in claim 1 wherein the valve member comprises an elongate switchover piston slidable between said first-mentioned and second-mentioned positions in a first cylinder in said body, one inlet communicating with one end and the other with the other end of said first cylinder, said outlet extending outward from said first cylinder intermediate its said ends, the latch comprising a piston axially slidable in a second cylinder extending outward from said first cylinder intermediate its said ends and open to said outlet for exposure to the pressure of fluid in the outlet, and said switchover piston and said latch piston having a cooperating recess and detent arrangement for holding the switchover piston in one or the other of its two positions.

8. A valve as set forth in claim 7 wherein said recess and detent arrangement comprises two annular grooves in said switchover piston spaced apart lengthwise thereof constituting the recess feature of the arrangement with the detent on the latch piston engageable in one or the other of said grooves for latching the switchover piston in one or the other of its two positions.

9. A valve as set forth in claim 8 wherein the latch piston has an end surface subject to pressure of fluid in the outlet and the detent is in a flat formation on the latch piston having an opening receiving the switchover piston.

10. A valve as set forth in claim 9 wherein the outlet is aligned with said second cylinder and said flat formation has an extension slidable in the outlet.

11. A valve as set forth in claim 7 wherein the second cylinder has an outer end and the latch piston is biased inward toward said retracted position by a coil compression spring in the second cylinder reacting from a seat adjustable in said outer end for adjustment of the compression of the spring.

12. A valve for switching over from one supply of pressure fluid to another supply thereof in response to failing or failure of the one supply, said valve comprising:

a valve body;

a first cylinder in the body extending endwise thereof;

two inlets in the body for connection thereto of the respective supplies, one communicating with one end and the other with the other end of said first cylinder;

an outlet in the body extending radially outward from the first cylinder generally at the center of length of the first cylinder;

a second cylinder in the body extending outward from said first cylinder intermediate its said ends and open to said outlet for exposure to the pressure of fluid in the outlet;

a piston constituting a switchover valve member slidable in the first cylinder between a position establishing communication for delivery of fluid from one inlet to the outlet and blocking flow from the other inlet to the outlet and a position establishing communication for delivery of fluid from the other inlet to the outlet and blocking flow from the one inlet to the outlet;

said piston being subject to pressure of fluid supplied to said one inlet for moving it from the first-mentioned position to the second-mentioned position and to pressure of fluid supplied to the other inlet for moving it from the second-mentioned position to the first-mentioned position;

a latch piston slidable in said second cylinder having a latch thereon for latching the valve member in one or the other of said positions, said latch being movable between a latching position engaging the valve member and a retracted position clearing the valve member for movement;

said latch being biased toward said retracted position and being held in latching position against the bias by pressure of fluid delivered by the valve member in one or the other of its said positions, said latch moving to said retracted position under the bias upon a drop in pressure of fluid delivered by the valve member in either of its said positions; and said switchover piston and said latch piston having a cooperating recess and detent arrangement for holding the switchover piston in one or the other of its two positions.

* * * * *